United States Patent
Chen et al.

(10) Patent No.: US 11,643,834 B2
(45) Date of Patent: May 9, 2023

(54) ACTIVE INERTER DAMPER

(71) Applicant: NATIONAL TAIWAN UNIVERSITY OF SCIENCE AND TECHNOLOGY, Taipei (TW)

(72) Inventors: Pei-Ching Chen, New Taipei (TW); Guan-Chung Ting, Taipei (TW); Po-Chang Chen, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 45 days.

(21) Appl. No.: 17/197,522

(22) Filed: Mar. 10, 2021

(65) Prior Publication Data

US 2022/0162872 A1    May 26, 2022

(30) Foreign Application Priority Data

Nov. 25, 2020   (TW) .................... 109141446

(51) Int. Cl.
*E04H 9/02* (2006.01)
*F16F 7/10* (2006.01)

(52) U.S. Cl.
CPC ......... *E04H 9/0215* (2020.05); *F16F 7/1005* (2013.01)

(58) Field of Classification Search
CPC .... E04H 9/0215; E04H 9/027; F16F 2232/06; F16F 7/1022; F16F 7/1005; F16F 7/10
See application file for complete search history.

(56) References Cited

U.S. PATENT DOCUMENTS

| 5,168,673 A | * | 12/1992 | Nemir | .................. F16F 15/005 52/167.1 |
| 8,672,107 B2 | * | 3/2014 | Ivanco | ..................... F16F 9/12 188/380 |

(Continued)

FOREIGN PATENT DOCUMENTS

| CN | 111503202 A | 8/2020 |
| JP | 5016086 B2 | 9/2012 |

(Continued)

OTHER PUBLICATIONS

Ubertini et al., "considerations on the implementation and Modeling of an Active Mass Driver with Electrical Torsional Servomotor," Mechanical Systems and Signal Processing, 58-59, (2015), pp. 53-69.*

(Continued)

*Primary Examiner* — Brian E Glessner
*Assistant Examiner* — Daniel J Kenny
(74) *Attorney, Agent, or Firm* — Maschoff Brennan

(57) ABSTRACT

This disclosure relates to an active inerter damper configured to be disposed on or in a building structure. The active inerter damper includes a base, a lead screw, a rotational mass block, a driving device and a controller. The lead screw is movably disposed above the base along an axial direction. The rotational mass block is engaged with the lead screw so as to be rotatable with respect to the base. The driving device is connected to the lead screw. The controller is electrically connected to the driving device, and the controller is configured to activate the driving device to move the lead screw along the axial direction so as to rotate the rotational mass block via the lead screw.

7 Claims, 3 Drawing Sheets

(56) References Cited

U.S. PATENT DOCUMENTS

| | | | | |
|---|---|---|---|---|
| 8,720,318 | B2* | 5/2014 | Fukano | H02K 7/116 |
| | | | | 92/167 |
| 9,316,297 | B2* | 4/2016 | Watanabe | F16F 9/12 |
| 10,962,076 | B2* | 3/2021 | Zhang | F16F 7/1005 |
| 2009/0108510 | A1* | 4/2009 | Wang | F16F 7/1022 |
| | | | | 267/75 |
| 2009/0139225 | A1* | 6/2009 | Wang | F15B 7/008 |
| | | | | 60/469 |
| 2017/0152872 | A1* | 6/2017 | Waki | F15B 15/1414 |
| 2018/0305922 | A1 | 10/2018 | Watanabe et al. | |
| 2021/0230896 | A1* | 7/2021 | Ripamonti | E04B 1/98 |
| 2022/0163094 | A1* | 5/2022 | Sun | F16F 15/1333 |

FOREIGN PATENT DOCUMENTS

| | | |
|---|---|---|
| TW | I321620 B | 3/2010 |
| TW | I691660 B | 4/2020 |
| TW | I703283 B | 9/2020 |
| WO | 2006/112159 A1 | 10/2006 |

OTHER PUBLICATIONS

Smith, Malcolm C., "Synthesis of mechanical networks: The inerter" Fellow, IEEE, Oct. 2002.
Chen et al., "The missing mechanical circuit element" IEEE Circuits and Systems Magazine, Mar. 2009.
TW Office Action in Application No. 109141446 dated Nov. 19, 2021.

* cited by examiner

ACTIVE INERTER DAMPER

CROSS-REFERENCE TO RELATED APPLICATIONS

This non-provisional application claims priority under 35 U.S.C. § 119(a) on Patent Application No(s). 109141446 filed in Taiwan, R.O.C. on Nov. 25, 2020, the entire contents of which are hereby incorporated by reference.

TECHNICAL FIELD

The present disclosure relates to an inerter damper, more particularly to an active inerter damper.

BACKGROUND

A tuned mass damper (TMD) can be applied to suppress earthquake, wind, and machine induced vibration in structure so as to prevent discomfort from building occupants.

The TMD is usually placed on the top or near the top of a building to obtain a good damping effect. It is found that the larger scale the building is, the larger mass the TMD employs to achieve an effective reduction in vibration and acceleration responses. However, the large-scale TMD occupies a large space in the top area of a building and it is needed to reinforce the floor and connected members to have a structural strength sufficient to support the TMD. For example, Taipei 101 with a height of 508 meters needs a room larger than a general floor height for placing a 661 metric tons TMD with a diameter of 5.5 meters (actually, the TMD is located between the 87th and 91st floors). In addition, a large-scale TMD has to overcome high friction and high inertial force to begins to oscillate. Thus, the large-scale TMD might not respond to lower-level earthquakes or winds hit, the building may be structurally fine but the magnitude of movement together with any induced vibration still will cause discomfort to the building occupants.

SUMMARY

The present disclosure provides an active inerter damper that avoids the aforementioned problems caused by large size, overweight, high friction and high inertial force of the conventional TMD.

According to one aspect of the present disclosure, an active inerter damper is configured to be disposed on or in a building structure. The active inerter damper includes a base, a lead screw, a rotational mass block, a driving device, and a controller. The lead screw is movably disposed above the base along an axial direction. The rotational mass block is engaged with the lead screw so as to be rotatable with respect to the base. The driving device is connected to the lead screw. The controller is electrically connected to the driving device, and the controller is configured to activate the driving device to move the lead screw along the axial direction so as to rotate the rotational mass block via the lead screw.

According to the active inerter damper discussed above, the active inerter damper converts a linear motion of the lead screw into a rotational motion of the rotational mass block with respect to the base and the building structure, which forms an inerter system. It is known that the inertial force generated by a rotating object is larger than that of the same object in linear oscillation movement. In this regard, a smaller mass of the rotational mass block will be able to generate a sufficient inertial force of rotation acting on the building structure. Therefore, the rotational mass block can be smaller and lighter than the mass block used in the conventional linear mass damper system, thereby preventing applying too much gravity force to the floor and avoiding occupying large space in the building structure.

Further, to activate the inerter system, it only needs to determine the force and direction acting on the linear moving object. Thus, the controller controls the driving device in a way only ensuring that the linear motion of the lead screw can make the rotational mass block generate a sufficient damper force to reduce the dynamic response of the building structure, instead of considering the force that the building structure exerts on the rotational mass block.

Furthermore, the rotation motion of the rotational mass block is triggered by the controller, that is, when and how the rotational mass block is rotating is not directly relevant to the motion of the building structure, thus there is no need to consider whether the motion of the building structure can overcome the friction of the rotational mass block. Instead, it only needs to ensure that the driving device can exert a force for the rotational mass block to overcome the friction between the rotational mass block and the lead screw. Thus, when the motion of the building structure is too small to move a conventional mass damper system, the controller can actively activate the rotational mass block to reduce the dynamic response of the building structure to prevent discomfort from building occupants.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
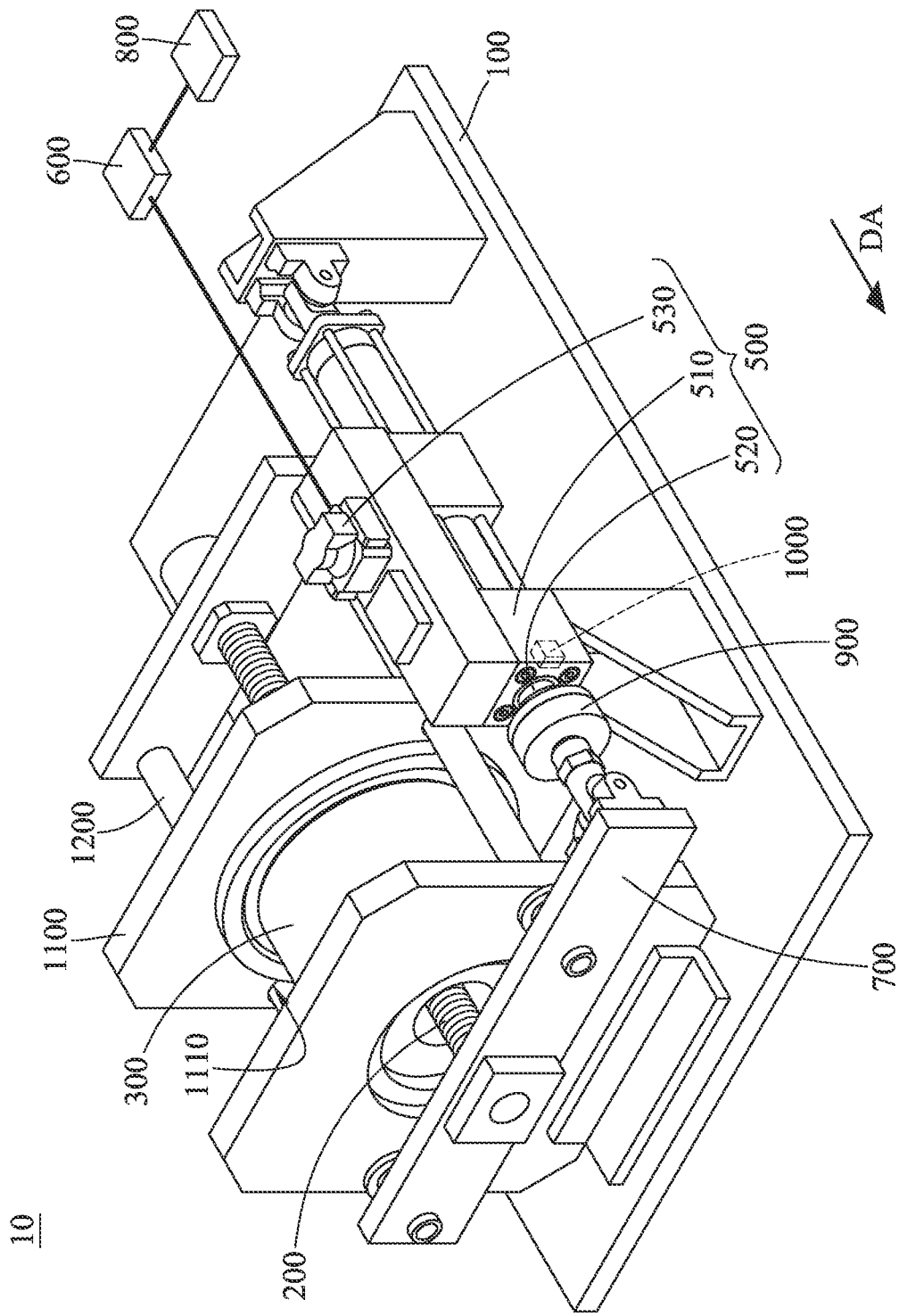
FIG. 1 is a perspective view of an active inerter damper according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, there is shown a perspective view of an active inerter damper 10 according to an embodiment of the present disclosure. The active inerter damper 10 is configured to be placed on or in a structure, such as a high-rise construction. It is known that the upper floors have larger acceleration and amplitude of vibrations under earthquakes or wind influences, thus the active inerter damper 10 is usually placed on or in the top or near the top of a building so as to obtain a good damping effect.

In this embodiment, the active inerter damper 10 includes a base 100, a lead screw 200, a rotational mass block 300, a driving device 500 and a controller 600. The active inerter damper 10 may be disposed in a manner that the base 100 faces the top floor of a building structure (not shown). The lead screw 200 is movably disposed above the base 100 and placed parallel to the base 100. In specific, the lead screw 200 has an axial direction DA parallel to the upper surface of the base 100. The rotational mass block 300 is served as a flywheel. The lead screw 200 is screwed through the rotational mass block 300 and can be aligned with a rotating axis of the rotational mass block 300. The driving device 500 may be disposed on the base 100, and the driving device 500 is connected to the lead screw 200. The controller 600 is electrically connected to the driving device 500 so as to activate the driving device 500. When the driving device 500 is activated by the controller 600, the driving device 500 moves the lead screw 200 along the axial direction DA, and the linear movement of the lead screw 200 can cause the rotational mass block 300 to rotate with respect to the base 100 about the axial direction DA. It is noted that the controller 600 can be placed on the base 100 or outside the base 100 as long as it is electrically connected to the driving device 500.

In this and some embodiments of the present disclosure, the controller may have a damping mode. When the controller 600 is switched to the damping mode, the controller 600 will actively activate the driving device 500 so as to linearly move the lead screw 200, and the linear movement of the lead screw 200 will cause the rotational mass block 300 to rotate.

Figure 2:
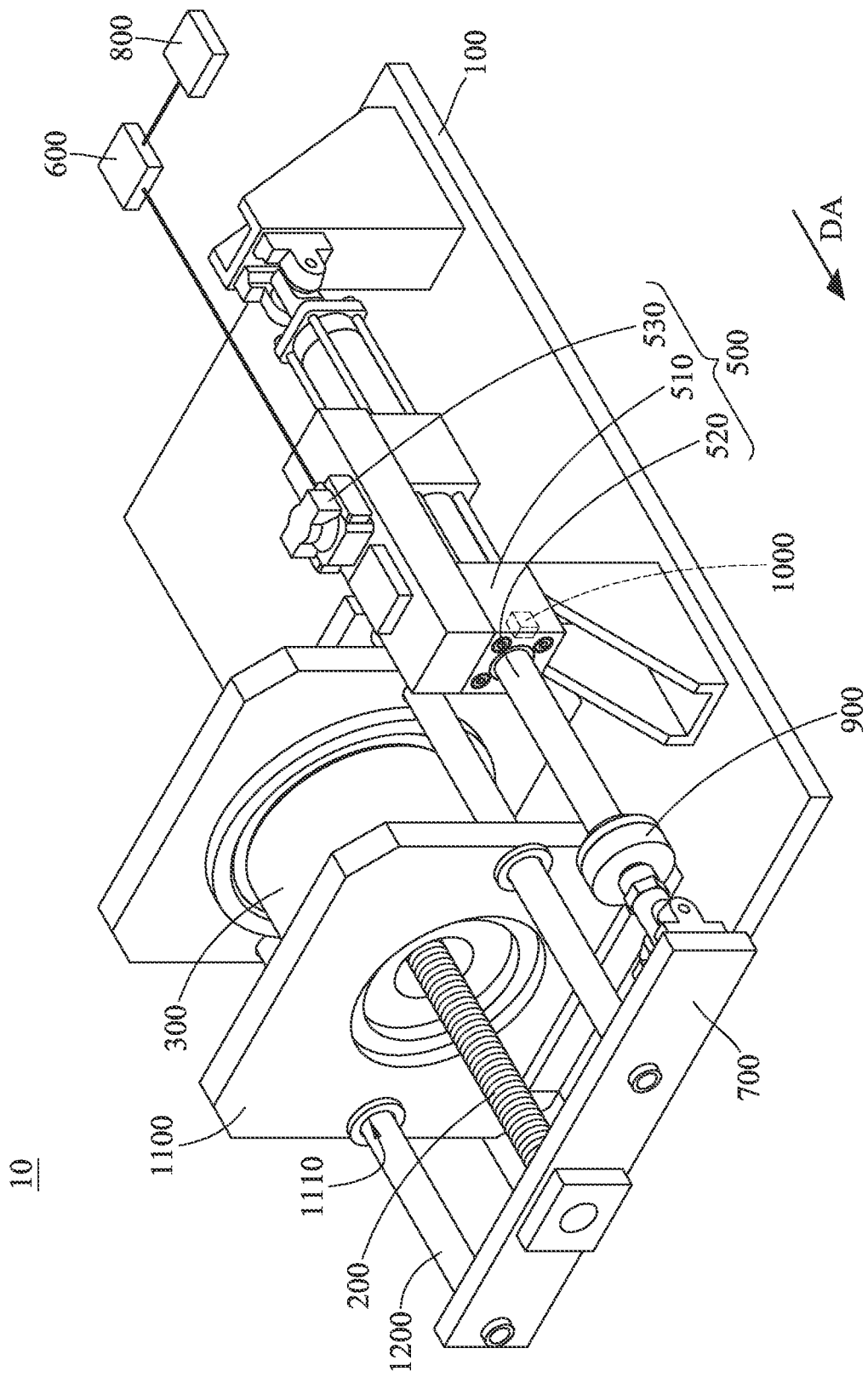
FIG. 2 is a perspective view showing a driving device of the active inerter damper in FIG. 1 is in operation.

Please refer to FIG. 2 for detailed description of the operation of the active inerter damper 10, where FIG. 2 is a perspective view showing a driving device of the active inerter damper in FIG. 1 is in operation. In this and some embodiments, the active inerter damper 10 may further include a connection plate 700. The driving device 500 is, for example, a hydraulic cylinder and includes a fixed component 510 (e.g., the casing of the hydraulic cylinder) and a movable component 520 (e.g., the piston rod of the hydraulic cylinder). The fixed component 510 is fixed on the base 100 via, a suitable bracket (not numbered). The movable component 520 is linearly movably disposed through the fixed component 510 and has an end fixed to the connection plate 700. The movable component 520 is movable in a direction parallel to the axial direction DA. As shown, one end of the lead screw 200 is also fixed to the connection plate 700. The driving device 500 may further include a valve 530. The controller 600 is electrically connected to the valve 530 so that the controller 600 can adjust the position of the valve 530 so as to change the speed of the movable component 520. Due to the meshing interaction between the rotational mass block 300 and the lead screw 200, the linear movement of the lead screw 200 with respect to the base 100 and the building structure will cause the rotation of the rotational mass block 300 with respect to the base 100 and the building structure.

It is known that the inertial force generated by a rotating object is larger than that of the same object in linear oscillation movement. In this regard, a smaller mass of the rotational mass block 300 will be able to generate a sufficient inertial force of rotation acting on the building structure. Therefore, the rotational mass block 300 can be smaller and lighter than the mass block used in the conventional linear mass damper system, thereby preventing applying too much gravity force to the floor and avoiding occupying large space in the building structure.

As discussed, the active inerter damper 10 converts a linear motion into a rotational motion and therefore form an inerter system. To activate the inerter system, it only needs to determine the force and direction acting on the linear moving object. Thus, the controller 600 controls the driving device 500 in a way only ensuring that the linear motion of the lead screw 200 can make the rotational mass block 300 generate a sufficient damper force to reduce the dynamic response of the building structure, instead of considering the force that the building structure exerts on the rotational mass block 300.

Furthermore, as discussed, the rotation motion of the rotational mass block 300 is triggered by the controller 600, that is, when and how the rotational mass block 300 is rotating is not directly relevant to the motion of the building structure, thus there is no need to consider whether the motion of the building structure can overcome the friction of the rotational mass block 300. Instead, it only needs to ensure that the driving device 500 can exert a force for the rotational mass block 300 to overcome the friction between the rotational mass block 300 and the lead screw 200. Thus, when the motion of the building structure is too small to move a conventional mass damper system, the controller 600 can actively activate the rotational mass block 300 to reduce the dynamic response of the building structure to prevent discomfort from building occupants.

In addition, the speed of the rotational mass block 300 can be determined by the controller 600, thus the active inerter damper 10 can provide a wide range of tuning frequency for a wide range of building structures. Accordingly, there is no need to customize TMD particular for every different building structure.

In this and some embodiments, the active inerter damper 10 may further include an acceleration sensor 800. The acceleration sensor 800 is configured to be disposed on or in the building structure to detect the acceleration of the building structure. The acceleration sensor 800 is electrically connected to the controller 600 and can transmit an acceleration signal in response to the acceleration of the building structure to the controller 600. Accordingly, in the damping mode, the controller 600 can timely obtain the change of the acceleration of the building structure and therefore can timely adjust the rotating speed of the rotational mass block 300, thereby improving the reduction in the motion of the building structure.

Further, in this and some embodiments, the controller 600 has two functions: calculating a required rotation speed of the rotational mass block 300 for sufficiently resisting the acceleration of the building structure based on the acceleration signal that is transmitted by the acceleration sensor 800; and calculating the amount and frequency of a force exerted by the driving device 500 for achieving the required rotation speed of the rotational mass block 300. However, the present disclosure is not limited thereto. In some other embodiments, there may be two separated controllers electrically connected to each other to respectively accomplish the two functions.

In this and some embodiments, the controller 600 may further have a measurement mode. In the measurement mode, the controller 600 rotates the rotational mass block 300 in a particular oscillation frequency according to a database (e.g., a sine waveform) stored in the controller 600. During this motion, the rotational mass block 300 produces an oscillation force to the building structure, and therefore the building structure begins to vibrate. At this moment, the acceleration sensor 800 measures the motion of the building structure and transmits a response signal to the controller 600. Then, the controller 600 calculates a resonant frequency and a damping ratio of the building structure accordingly.

For example, the measurement mode can be performed when the active inerter damper 10 is attached on a building structure, such that the active inerter damper 10 can obtain the resonant frequency and the damping ratio of the building structure by slightly vibrating the building structure. And the result can be used as a database for the controller 600 to determine how to activate the rotational mass block 300 to decrease the earthquake or wind-induced motion of the building structure. In this concept, the active inerter damper 10 can provide optimal damping effect for different building structures by obtaining their resonant frequency and the damping ratio.

Further, the controller 600 can perform the measurement mode again to confirm whether there is a change in the resonant frequency and the damping ratio of the building structure due to natural or man-made consequences. If the resonant frequency and the damping ratio change, the parameters of the controller 600 to activate the driving device 500 will be adjusted accordingly. If there is too much change in the resonant frequency and the damping ratio, the controller 600 can warn the users that the building structure might have serious damage.

The change of the resonant frequency and the damping ration may occur when there is a large-scale changing such as building renovation or massive interiors relocation. The controller 600 can confirm this matter and then accordingly adjust the parameters thereof to produce an optimal mode for operating the driving device 500.

In this and some embodiments, the active inerter damper 10 may further include a force gauge 900 and a displacement gauge 1000. The force gauge 900 is a measuring instrument to measure force. The force gauge 900 is disposed between the movable component 520 and the lead screw 200 or between the movable component 520 and the connection plate 700. The force gauge 900 is electrically connected to the controller 600. The force gauge 900 can measure the force acting on the movable component 520 and transmit it to the controller 600. The displacement gauge 1000 is a measuring instrument to measure travel range between where an object is in a reference position. The displacement gauge 1000 is disposed between the movable component 520 and the fixed component 510. The displacement gauge 1000 is electrically connected to the controller 600. The displacement gauge 1000 can measure a displacement of the movable component 520 and transmit it to the controller 600. Based on the results generated by the force gauge 900 and the displacement gauge 1000, the controller 600 can determine an optimal way of moving the movable component 520, allowing the rotational mass block 300 to generate a damping force at a particular structural frequency to significantly reduce the motion of the building structure. It is noted that the displacement gauge 1000 may be disposed outside or inside the fixed component 510 but in contact with the movable component 520, such an arrangement of the displacement gauge 1000 still can detect the movement of the movable component 520.

In this and some embodiments, the active inerter damper 10 may further include two fixed plates 1100 and two guide rods 1200. The fixed plates 1100 are spaced apart from each other and stand on the base 100. The rotational mass block 300 is located between the fixed plates 1100. The fixed plates 1100 each have two openings 1110. The guide rods 1200 are disposed through the openings 1110. And the connection plate 700 is attached to the same end of the guide rods 1200. As shown in FIG. 1 and FIG. 2, the connection plate 700 can move the guide rods 1200 backwards and forwards during the linear motion of the movable component 520. The openings 1110 of the fixed plates 1100 are to secure a smooth and linear path of the guide rods 1200 and therefore can ensure the motion of the connection plate 700 and the lead screw 200, improving the stability of the active inerter damper 10. In addition, ball bearings (not shown) may be arranged between the fixed plates 1100 and the rotational mass block 300 to reduce the friction and improve the stability of the rotational mass block 300.

As shown in FIG. 1 and FIG. 2, in the abovementioned embodiment, the movable component 520 and the lead screw 200 are disposed parallel to each other. This can transfer the force generated by the driving device 500 to parallel position. Therefore, the lead screw 200, thus the length of the active inerter damper 10 along the axial direction DA can be short. However, the present disclosure is not limited thereto.

Figure 3:
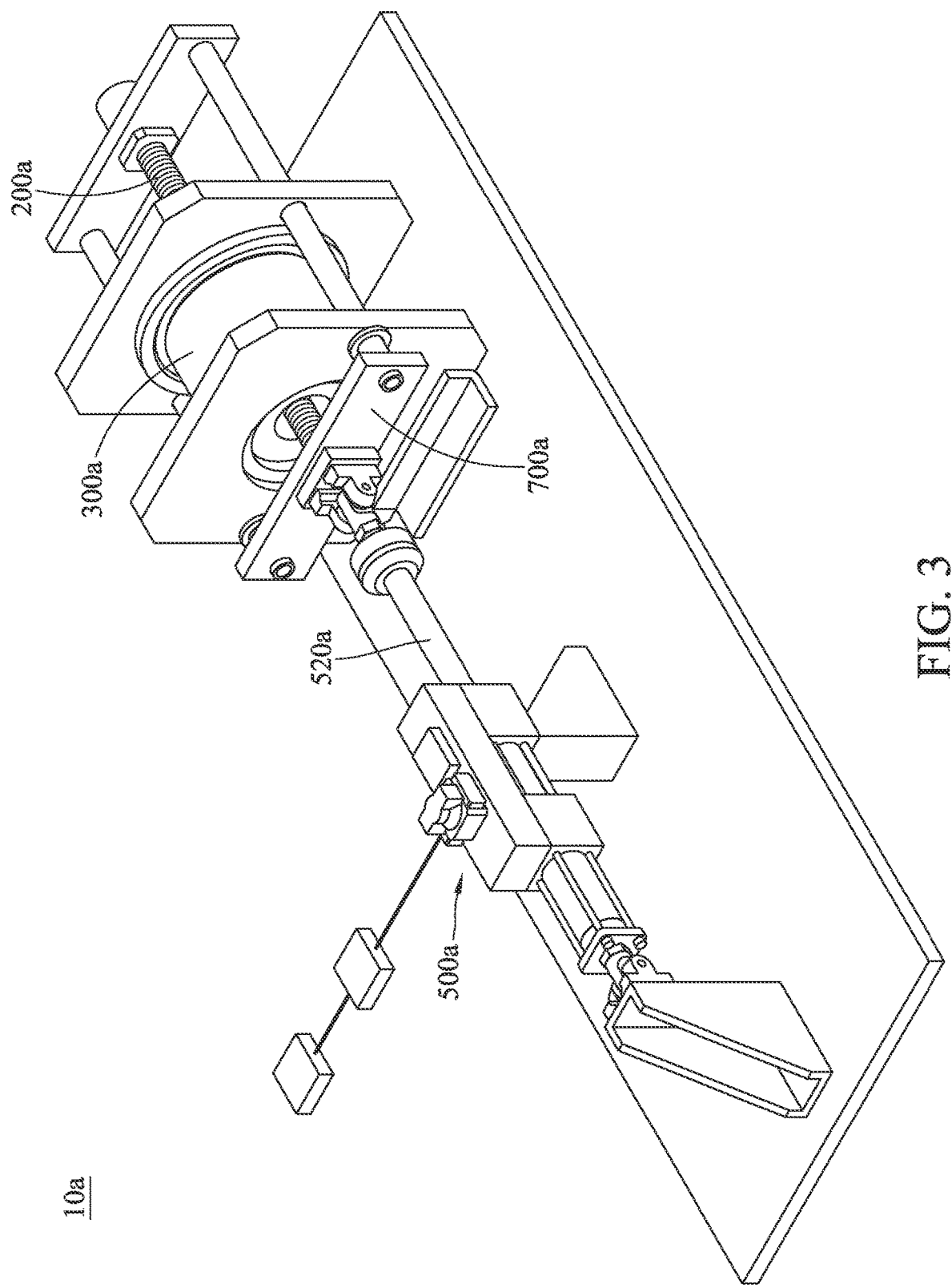
FIG. 3 is a perspective view of an active inerter damper according to another embodiment of the present disclosure.

Please refer to FIG. 3, there is shown a perspective view of an active inerter damper according to another embodiment of the present disclosure. Note that only differences between this and the abovementioned embodiment will be described hereinafter. In this and some embodiments, the lead screw 200a is arranged coaxially with the movable component 520a. Accordingly, the force that the driving device 500a acts on the rotational mass block 300 is on the axial direction DA, which can further increase the accuracy of the force transmission.

According to the active inerter damper discussed above, the active inerter damper converts a linear motion of the lead screw into a rotational motion of the rotational mass block with respect to the base and the building structure, which forms an inerter system. It is known that the inertial force generated by a rotating object is larger than that of the same object in linear oscillation movement. In this regard, a smaller mass of the rotational mass block will be able to generate a sufficient inertial force of rotation acting on the building structure. Therefore, the rotational mass block can be smaller and lighter than the mass block used in the conventional linear mass damper system, thereby preventing applying too much gravity force to the floor and avoiding occupying large space in the building structure.

Further, to activate the inerter system, it only needs to determine the force and direction acting on the linear moving object. Thus, the controller controls the driving device in a way only ensuring that the linear motion of the lead screw can make the rotational mass block generate a sufficient damper force to reduce the dynamic response of the building structure, instead of considering the force that the building structure exerts on the rotational mass block.

Furthermore, the rotation motion of the rotational mass block is triggered by the controller, that is, when and how the rotational mass block is rotating is not directly relevant to the motion of the building structure, thus there is no need to consider whether the motion of the building structure can overcome the friction of the rotational mass block. Instead, it only needs to ensure that the driving device can exert a force for the rotational mass block to overcome the friction between the rotational mass block and the lead screw. Thus, when the motion of the building structure is too small to move a conventional mass damper system, the controller can actively activate the rotational mass block to reduce the dynamic response of the building structure to prevent discomfort from building occupants.

In addition, the speed of the rotational mass block 300 can be determined by the controller 600, thus the active inerter damper 10 can provide a wide range of tuning frequency for a wide range of building structures. Accordingly, there is no need to customize TMD particular for every different building structure.

In some embodiments, the active inerter damper may further includes an acceleration sensor. Accordingly, in the damping mode, the controller 600 can timely obtain the change of the acceleration of the building structure and therefore can timely adjust the rotating speed of the rotational mass block, thereby improving the reduction in the motion of the building structure.

In some embodiments, the controller may further have a measurement mode. In the measurement mode, the controller rotates the rotational mass block in a particular oscillation frequency according to a database stored in the controller. During this motion, the rotational mass block produces an oscillation force to the building structure, and therefore the building structure begins to vibrate. At this moment, the acceleration sensor measures the motion of the building structure and transmits a response signal to the controller. Then, the controller calculates a resonant frequency and a damping ratio of the building structure accordingly.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. An active inerter damper, configured to be disposed on or in a building structure, the active inerter damper comprising:
   a base;
   a lead screw, disposed above the base and linearly movable along an axial direction;
   a rotational mass block, engaged with the lead screw so as to be rotatable with respect to the base;
   a driving device, comprising:
      a fixed component, fixed on the base; and
      a movable component, has an end movably disposed in the fixed component and another end connected to the lead screw so as to activate the lead screw to move;
   a controller, electrically connected to the driving device, wherein the controller is configured to activate the driving device to linearly move the lead screw along the axial direction so as to rotate the rotational mass block via the lead screw;
   a connection plate, connected to and disposed between an end of the lead screw that is located away from the rotational mass block and the another end of the movable component of the driving device;
   a fixed plate, standing on the base, wherein the fixed plate has an opening; and
   a guide rod, having an end disposed through the opening of the fixed plate and another end connected to the connection plate.

2. The active inerter damper according to claim 1, further comprising an acceleration sensor configured to be disposed on or in the building structure to detect an acceleration of the building structure, wherein the acceleration sensor is electrically connected to the controller so as to transmit an acceleration signal in response to the acceleration of the building structure to the controller.

3. The active inerter damper according to claim 2, wherein the controller has a damping mode, in the damping mode, the controller activates the rotational mass block to rotate according to the acceleration signal transmitted by the acceleration sensor, and the rotational mass block generates an inertial force for resisting the acceleration of the building structure.

4. The active inerter damper according to claim 2, wherein the controller has a measurement mode, in the measurement mode, the controller activates the rotational mass block to rotate according to a database stored in the controller, the rotational mass block generates an oscillation force to vibrate the building structure, the acceleration sensor is configured to measure a vibrating motion of the building structure and transmits a response signal in response to the vibrating motion of the building structure to the controller, and the controller is configured to calculate a resonant frequency and a damping ratio of the building structure according to the response signal transmitted by the acceleration sensor.

5. The active inerter damper according to claim 1, further comprising a force gauge and a displacement gauge, wherein the force gauge is disposed between the movable component and the lead screw so as to measure a force acting on the movable component, the force gauge is electrically connected to the controller so as to transmit a force signal in response to the force acting on the movable component to the controller, the displacement gauge is disposed between the movable component and the fixed component so as to measure a displacement of the movable component, and the displacement gauge is electrically connected to the controller so as to transmit a displacement signal in response to the displacement of the movable component to the controller.

6. The active inerter damper according to claim 1, wherein the movable component is disposed parallel to the lead screw.

7. The active inerter damper according to claim 1, wherein the movable component is disposed coaxial with the lead screw.

* * * * *